US011541837B2

(12) United States Patent
Lee et al.

(10) Patent No.: US 11,541,837 B2
(45) Date of Patent: Jan. 3, 2023

(54) AIRBAG APPARATUS FOR VEHICLE

(71) Applicant: Autoliv Development AB, Vargarda (SE)

(72) Inventors: Seung-Jin Lee, Hwaseong-si (KR); Dong-Young Kim, Hwaseong-si (KR)

(73) Assignee: Autoliv Development AB, Vargarda (SE)

( * ) Notice: Subject to any disclaimer, the term of this patent is extended or adjusted under 35 U.S.C. 154(b) by 90 days.

(21) Appl. No.: 17/049,501

(22) PCT Filed: Apr. 2, 2019

(86) PCT No.: PCT/KR2019/003861
§ 371 (c)(1),
(2) Date: Oct. 23, 2020

(87) PCT Pub. No.: WO2019/208947
PCT Pub. Date: Oct. 31, 2019

(65) Prior Publication Data
US 2021/0253054 A1 Aug. 19, 2021

(30) Foreign Application Priority Data
Apr. 23, 2018 (KR) .................. 10-2018-0046732

(51) Int. Cl.
*B60R 21/21* (2011.01)
*B60R 21/233* (2006.01)
(Continued)

(52) U.S. Cl.
CPC ............ *B60R 21/21* (2013.01); *B60R 21/233* (2013.01); *B60R 21/237* (2013.01); *B60R 21/264* (2013.01)

(58) Field of Classification Search
CPC .................. B60R 21/21; B60R 21/233; B60R 2021/2173; B60R 2021/23107;
(Continued)

(56) References Cited

U.S. PATENT DOCUMENTS 5,224,732 A * 7/1993 Warner ............... B60R 21/0136
280/730.2
5,492,361 A 2/1996 Kim
(Continued)

FOREIGN PATENT DOCUMENTS

CN 109398049 A * 3/2019 ............ B60J 5/0413
DE 102014006862 A1 * 11/2015 ........... B60R 21/207
(Continued)

OTHER PUBLICATIONS

Yeol, K. KR 2006-0016398A Seat Belt Structure of Automobile, English Translation, ip.com (Year: 2006).*

*Primary Examiner* — Karen Beck
(74) *Attorney, Agent, or Firm* — Harness, Dickey & Pierce, P.L.C.; Stephen T. Olson

(57) ABSTRACT

The present invention relates to an airbag apparatus for a vehicle. In order to attain the purpose, the airbag apparatus for a vehicle according to the present invention comprises: a mounting board positioned in front of a rider; and an airbag module which is installed on the mounting board and, when a vehicle collides, restrains and protects the rider by means of inflating and expanding an airbag cushion toward the rider. Therefore, when the vehicle collides, the airbag cushion is inflated and expanded from the mounting board and thus the rider can safely be protected.

15 Claims, 10 Drawing Sheets

(a)

(b)

(c)

(51) Int. Cl.
  *B60R 21/237* (2006.01)
  *B60R 21/264* (2006.01)
(58) Field of Classification Search
  CPC .... B60R 21/2338; B60N 2/753; B60N 2/777; B60N 21/23138; B60N 2/78
  See application file for complete search history.

(56) References Cited

U.S. PATENT DOCUMENTS

| | | | | |
|---|---|---|---|---|
| 8,215,671 | B2 * | 7/2012 | Bergstrom | B60R 21/231 280/743.2 |
| 8,480,125 | B1 * | 7/2013 | Belwafa | B60R 21/21 280/730.2 |
| 10,023,148 | B2 * | 7/2018 | Choi | B60R 21/23138 |
| 10,759,376 | B2 * | 9/2020 | Jindal | B60R 21/20 |
| 2005/0173901 | A1 * | 8/2005 | Wu | B60R 21/08 280/730.2 |
| 2005/0206138 | A1 * | 9/2005 | Breuninger | B60R 21/233 280/730.2 |
| 2008/0084052 | A1 * | 4/2008 | Abney | B60R 21/233 280/730.2 |
| 2012/0193897 | A1 * | 8/2012 | Ruedisueli | B60R 21/21 280/730.2 |
| 2013/0088056 | A1 * | 4/2013 | Quatanens | B60R 21/231 297/216.13 |
| 2017/0240285 | A1 * | 8/2017 | Strobl | B64D 11/06205 |

FOREIGN PATENT DOCUMENTS

| | | | | |
|---|---|---|---|---|
| FR | 2876065 A1 | * | 4/2006 | ........... B60N 2/4606 |
| JP | 2004284426 A | * | 10/2004 | ............... B60N 2/78 |
| JP | 2007-083835 A | | 4/2007 | |
| JP | 2009-208566 A | | 9/2009 | |
| JP | 2012012015 A | * | 1/2012 | |
| JP | 2013112221 A | * | 6/2013 | |
| KR | 1998-0052800 A | | 9/1998 | |
| KR | 10-2006-0016398 A | | 2/2006 | |
| KR | 102088495 B1 | * | 1/2020 | ............ B60R 21/207 |
| WO | WO-9607563 A1 | * | 3/1996 | ............ B60N 2/4235 |
| WO | WO-2019197164 A1 | * | 10/2019 | ............. B60R 21/16 |
| WO | WO-2020085304 A1 | * | 4/2020 | ............. B60N 2/763 |
| WO | WO-2022008403 A1 | * | 1/2022 | ............. B60J 5/0413 |

* cited by examiner (a)　　　　　　(b)　　　　　　(c)

(a) (b) (c)

(a) (b) (c)

(a) (b) (c)

(a)

(b)

(a) (b)

(a)          (b)

(a)

(b)

(a)

(b)

(a)

(b)

(a)

(b)

AIRBAG APPARATUS FOR VEHICLE

TECHNICAL FIELD

The present invention relates to an airbag apparatus for a vehicle, and more particularly, to an airbag apparatus for a vehicle, which is inflated and expanded between a frontal airbag and a rider when the vehicle collides, and protects the rider.

BACKGROUND ART

In general, an airbag apparatus for a vehicle is a safety device that protects the rider by rapidly inflating an airbag by injecting a gas into the airbag according to a signal of an impact detection sensor upon vehicle collision.

Such an airbag apparatus is installed in a steering wheel, a dashboard, a seat, a sidewall, etc. provided in a vehicle, and is inflated toward the front or side of a rider upon collision of a vehicle, and protects the rider.

That is, a vehicle may be provided with a frontal airbag expanded in front of a driver seat and a passenger seat, a curtain airbag and a side airbag expanded from the side of a rider to protect the rider, and a knee airbag to protect the rider's knees.

Recently, autonomous vehicles moving by themselves without drivers' driving are developing.

The autonomous vehicle detects states of respective devices provided in the vehicle and the surroundings of the vehicle by using a high-tech sensor for recognizing objects around the vehicle and a high-performance graphic processing device, and travels while controlling driving of the respective devices provided in the vehicle according to the result of the detection.

The high-tech sensor measures the distance between objects like a human, and detects danger and helps a driver view all areas without a blind spot. In addition, the graphic processing device recognizes a surrounding environment of the vehicle through various cameras, and analyzes the images and helps the vehicle drive safely.

For example, a LiDAR device, a sound wave device, a 3D camera, a radar device, and etc. may be mounted in the autonomous vehicle.

As the autonomous vehicles configured as described above do not require drivers to drive, all seats including a driver seat can freely rotate and an angle of a back of a seat can be adjusted to be horizontal by a tilting operation.

A rider can adjust the angle of the back of the seat variously, and may rotate the seat to have a meeting facing a rider on a back seat.

Accordingly, it is impossible to apply a normal airbag apparatus which is designed with reference to a posture of a rider sitting on a seat facing forward to the autonomous vehicles.

Patent Document 1 and Patent Document 2 presented below disclose a passenger protection system configuration for vehicles.

CITED REFERENCES (Patent Document 1) Korean Patent Registration No. 10-1655569 (published on Sep. 8, 2016)
(Patent Document 2) Korean Patent Registration No. 10-1611087 (published on Apr. 11, 2016)

DISCLOSURE OF INVENTION

Technical Problems

An airbag apparatus for a vehicle according to related-art technology may not effectively restrain a rider depending on a posture and an angle of the rider.

For example, FIGS. 1 and 2 are views illustrating a protection area of an airbag cushion according to a posture of a rider.

In general, a volume of an airbag cushion 1 is designed with reference to a posture of a rider sitting facing forward as shown in FIG. 1.

Accordingly, when a rider sits leaning back in an autonomous driving mode as shown in FIG. 2, a space between the airbag cushion 1 and the rider increases, and accordingly, the rider is not effectively restrained. Therefore, there is a problem of high probability of injury.

Accordingly, there is a demand for development of a technique for protecting a rider safely by adding an airbag cushion for compensating for a space between the rider and an airbag cushion to a mounting board, etc. used by the rider in an autonomous driving mode.

An object of the present invention is suggested for solution to the above-mentioned problem, and it is to provide an airbag apparatus for a vehicle, which can safely protect a rider upon vehicle collision, by compensating for a space between the rider and a frontal airbag cushion.

Another object of the present invention is to provide an airbag apparatus for a vehicle, which can protect a rider by adding an airbag cushion inflated and expanded toward a space between a frontal airbag cushion and the rider and a side of the rider.

Still another object of the present invention is to provide an airbag apparatus for a vehicle which can prevent a secondary accident caused by an object seated on a mounting board upon vehicle collision.

Solution to Problem

To achieve the above-described objects, an airbag apparatus for a vehicle according to the present invention includes a mounting board positioned in front of a rider, and an airbag module installed on the mounting board, and configured to inflate and expand an airbag cushion toward the rider when the vehicle collides, and to restrain and protect the rider.

Advantageous Effects of Invention

According to the airbag apparatus for the vehicle according to the present invention as described above, the airbag cushion is inflated and expanded from the mounting board when the vehicle collides, so that the rider can safely be protected.

In addition, according to the present invention, the airbag cushion is installed in one or more of a center and an inner side end of the mounting board, so that the front and the inner side of the rider can be restrained and an injury of the rider can be minimized.

In addition, according to the present invention, there is an effect that a secondary accident caused by a flying book or object from the mounting board when the vehicle collides can be prevented.

BEST MODE FOR CARRYING OUT THE INVENTION

Hereinafter, an airbag apparatus for a vehicle according to preferred embodiments of the present invention will be described in detail with reference to the accompanying drawings.

Although operations when an autonomous driving mode is set by using a configuration of an airbag apparatus applied to an autonomous vehicle are described, the present invention is not limited thereto, and it should be noted that the prevent invention may be changed to compensate for a space between a related-art airbag cushion and a rider according to a posture of the rider in a normal vehicle.

In the following description, a direction facing the front surface of a vehicle with reference to a driver seat is referred to as 'front,' and a direction facing the back surface of the vehicle is referred to as 'rear.' Along with these terms, terms indicating directions such as 'left side,' 'right side,' 'upper' and 'lower' are defined to indicate respective directions with respect to the front and the rear.

The airbag apparatus for the vehicle according to the present invention includes a mounting board installed on an inner side surface of a door of the vehicle to be expanded toward the front of a rider, and an airbag module installed on the mounting board to inflate and expand an airbag cushion toward the rider upon vehicle collision and to restrain and protect the rider along with a frontal airbag cushion.

First, configurations of the door and the mounting board to which the airbag apparatus for the vehicle is applied according to preferred embodiments of the present invention will be described with reference to FIGS. 3 to 6.

FIGS. 3 to 6 are views illustrating examples of the door and the mounting board to which the airbag apparatus for the vehicle according to preferred embodiments of the present invention is applied.

View (a) of FIG. 3 to FIG. 6 illustrate the mounting board installed on the door, and views (b) and (c) of FIG. 3 to FIG. 6 illustrate operation states of expanding of the mounting board.

The mounting board 20 may be installed on the door 10 of the vehicle to hold a book for a rider to read, or to support food or an object.

Figure 1:
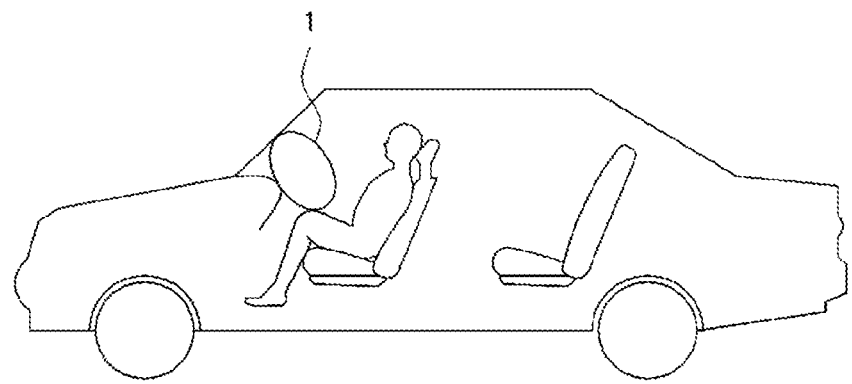
FIGS. 1 and 2 are views illustrating a protection area of an airbag cushion according to a posture of a rider.
Figure 2:
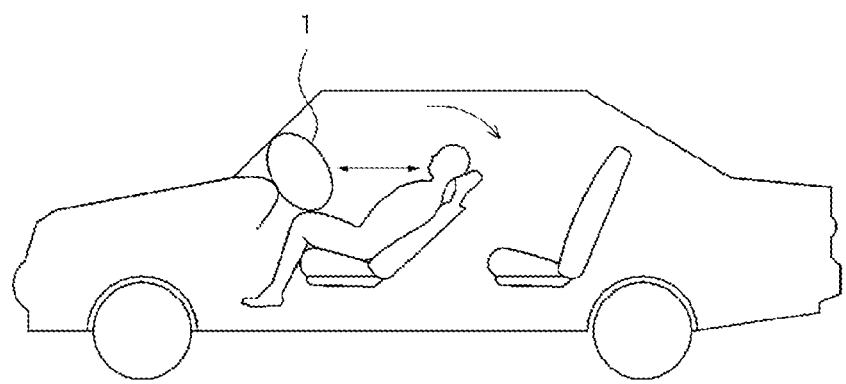
Figure 3:
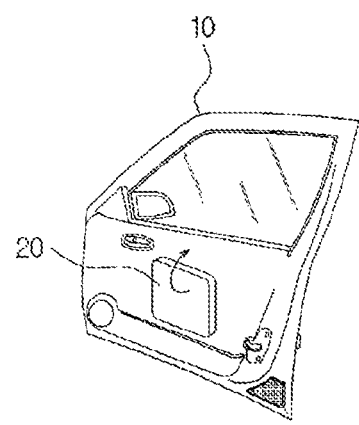
FIGS. 3 to 6 are views illustrating examples of a door and a mounting board to which an airbag apparatus for a vehicle according to preferred embodiments of the present invention is applied.
Figure 3:
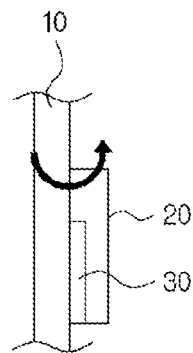
Figure 3:
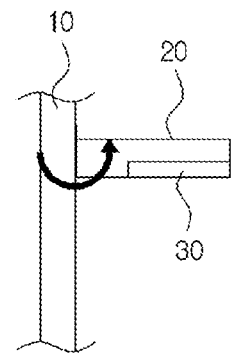

As shown in FIG. 3, the mounting board 20 may be installed on an inner side surface of the door 10 to rotate in a vertical direction with reference to an upper end or a lower end.

Figure 4:
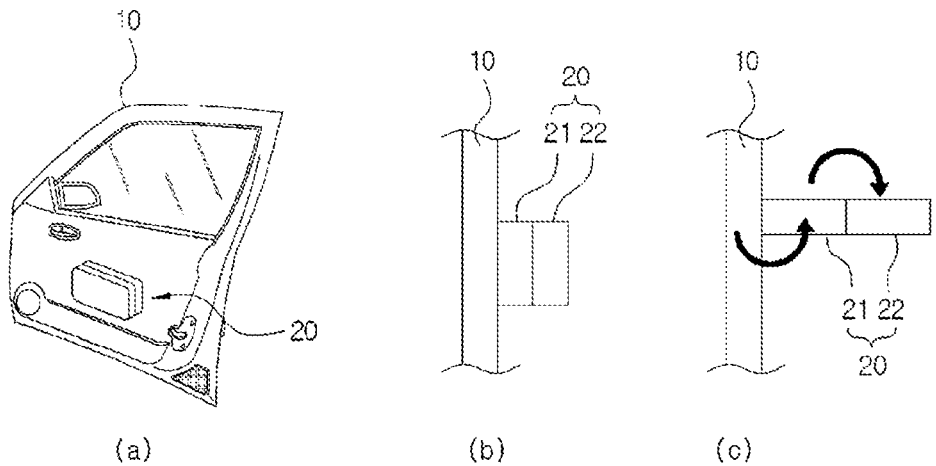

In addition, as shown in FIG. 4, the mounting board 20 may be divided into a plurality of plates 21, 22, and may be expanded in a horizontal direction when in use.

Herein, the respective plates 21, 22 may be configured to be folded to overlap each other on an inner surface of the door 10 to minimize a volume of the mounting board 20 when not in use.

Figure 5:
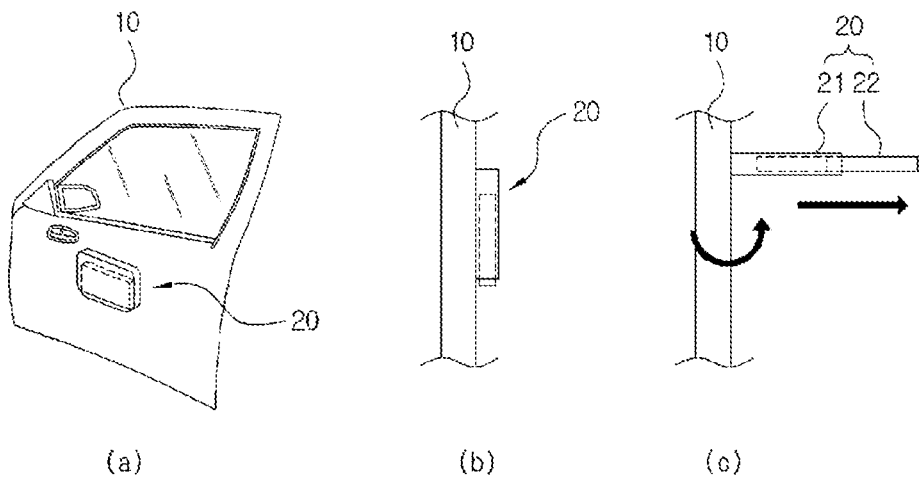

In addition, as shown in FIG. 5, the mounting board 20 may be configured to make the plurality of plates 21, 22 slide in sequence and to expand the plates 21, 22 toward the front of a rider.

Figure 6:
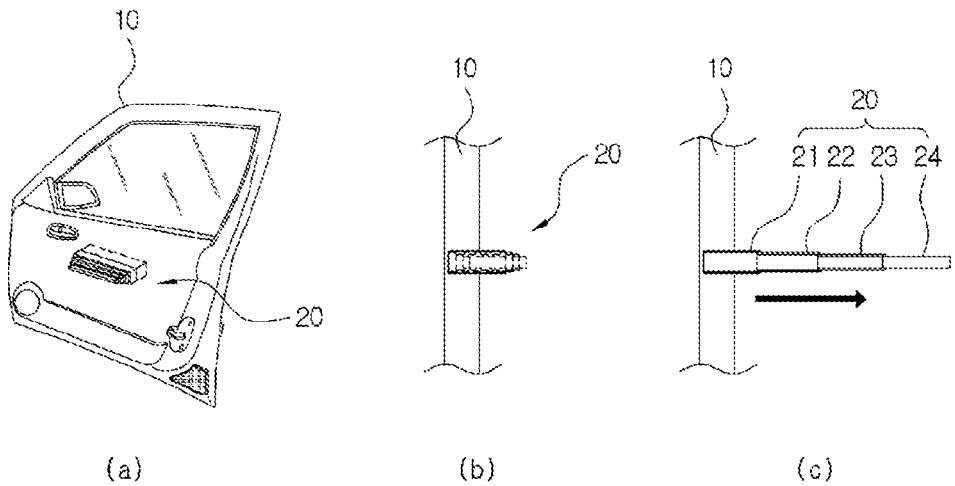

In addition, as shown in FIG. 6, the mounting board 20 may be configured to make a plurality of plates 21 to 24, received inside the door 10, slide in sequence and to expand the plates toward the front of the rider.

Figure 7:
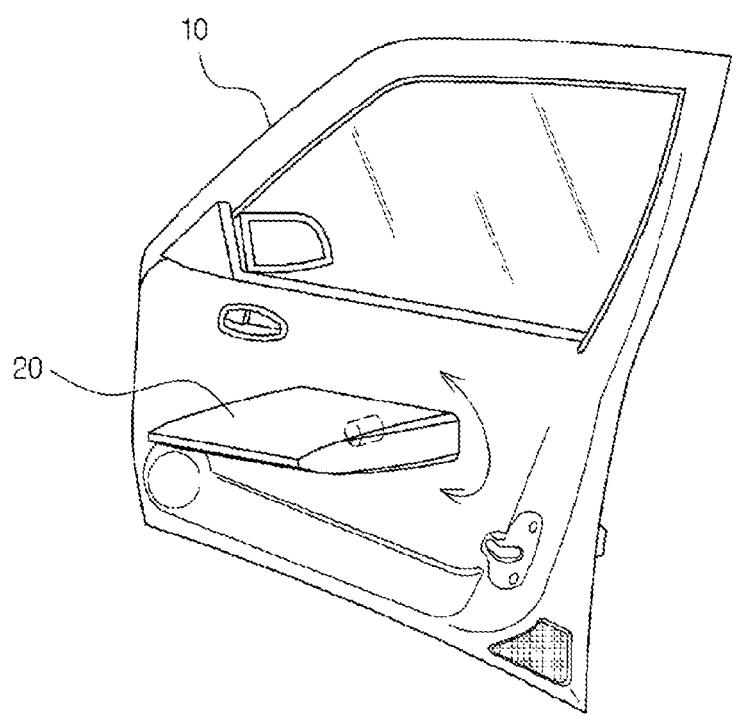
FIG. 7 is a view illustrating a rotational operation of the mounting board.
Figure 8:
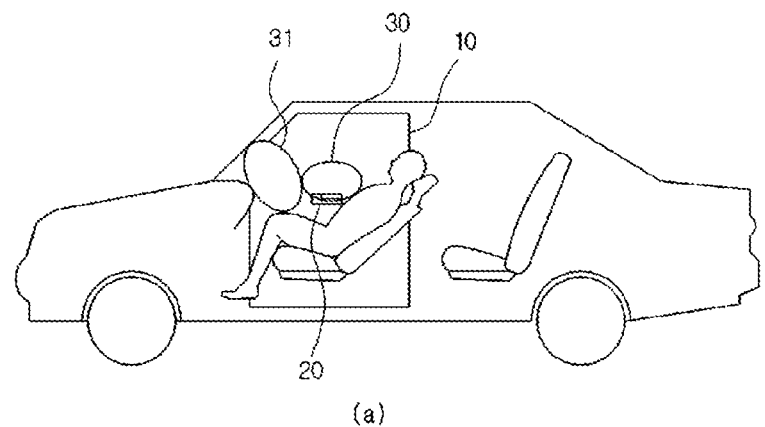
FIG. 8 is a view illustrating a state of an airbag cushion which is inflated and expanded in the airbag apparatus for the vehicle according to the present invention.
Figure 8:
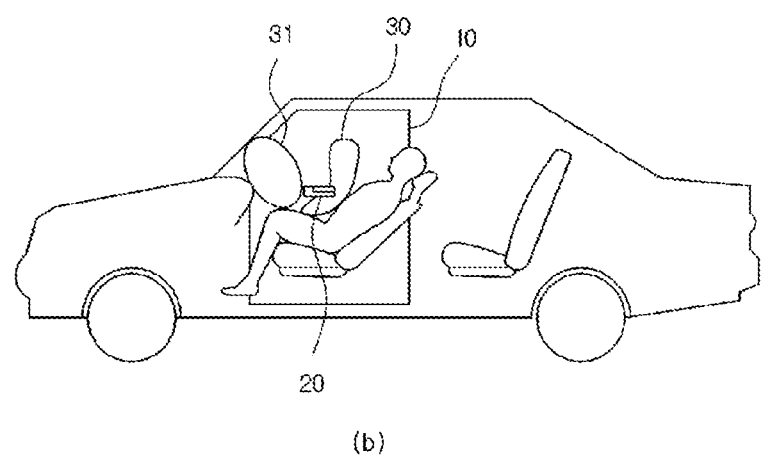

FIG. 7 is a view illustrating a rotational operation of the mounting board, and FIG. 8 is a view illustrating a state in which the airbag cushion is inflated and expanded in the airbag apparatus for the vehicle according to the present invention.

As shown in FIG. 7, the mounting board 20 may be installed to rotate about a shaft coupled to the door 10 in forward and backward directions, so that a rider sitting on the seat can adjust an angle of the mounting board 20 in the forward and backward directions.

To achieve this, a motor (not shown) may be installed inside the door 10 to generate a driving force to rotate the shaft on which the mounting board 20 is installed.

Therefore, when a manipulation signal is inputted through an input unit (not shown) for receiving an input of a manipulation signal of a user, a controller (not shown) for controlling driving of the airbag module 30 may control the motor to rotate in a forward or reverse direction and to adjust the angle of the mounting board 20.

Of course, the present invention may be configured to rotate the mounting board by manipulation of the rider without using a separate motor.

Accordingly, as shown in view (a) of FIG. 8, the airbag module 20 may be installed on the mounting board 20 which is expanded from the door 10 toward the front of the rider in a horizontal direction, and may be inflated and expanded between a frontal airbag cushion 31 and the rider when the vehicle collides, and may restrain and safely protect the rider along with the front airbag cushion 31.

Along with this, the airbag module 30 may be inflated and expanded from an inner side end of the mounting board 20 to protect the side of the rider.

In addition, as shown in view (b) of FIG. 8, the airbag module 30 may be installed inside or under the mounting board 20, and may be inflated and expanded toward rider's abdomen and may restrain the rider's abdomen when the vehicle collides.

Alternatively, the frontal airbag cushion 30 may be inflated and expanded from the mounting board 20 toward the rider's abdomen or lower body, and may restrain the rider's abdomen or lower body, first, when the vehicle collides.

Accordingly, the present invention inflates and expands the airbag cushion at the time of initial collision, and restrains the rider not to move toward the front of the vehicle, so that a collision between the rider and the vehicle caused by the movement of the rider can be prevented in advance.

Although it is illustrated that the mounting board 20 is installed to be expanded from the door 10 toward the front of the rider, the present invention is not necessarily limited thereto.

Figure 9:
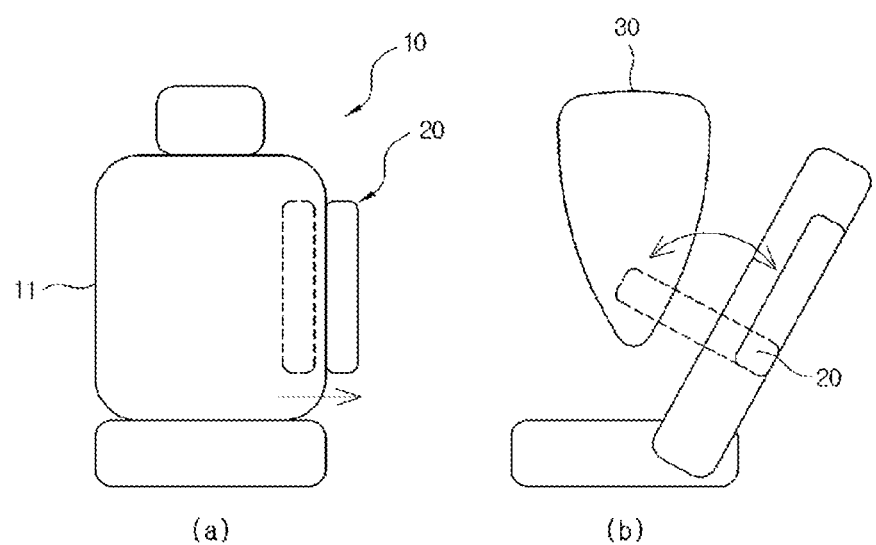
FIGS. 9 and 10 are views illustrating a mounting board according to another embodiment of the present invention.
Figure 10:
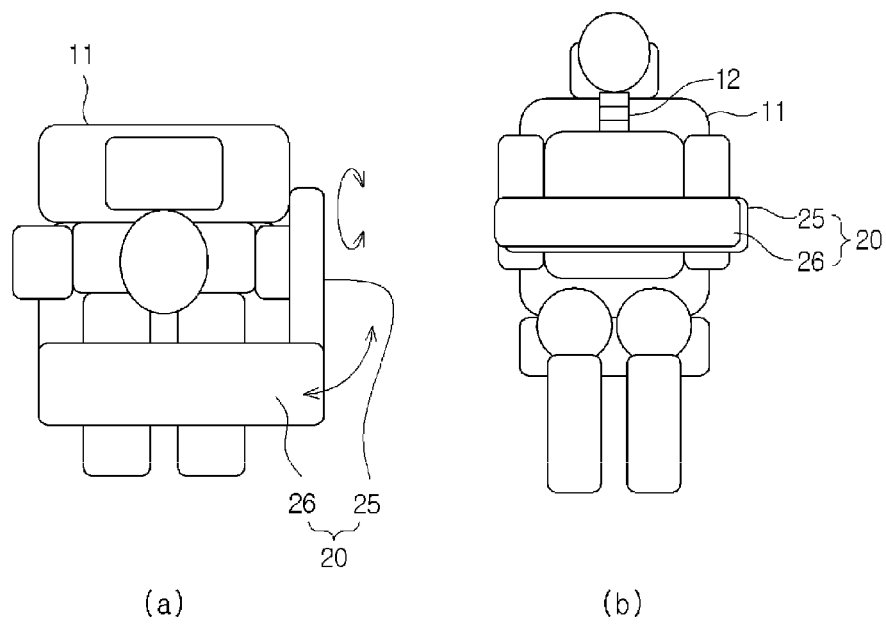

For example, FIGS. 9 and 10 are views illustrating a mounting board according to another embodiment of the present invention.

Views (a) and (b) of FIG. 9 illustrate a state in which the mounting board is expanded from a seat toward the side of a rider, and views (a) and (b) of FIG. 10 illustrate a state in which the mounting board is expanded from a seat towards the side and the front of a rider.

As shown in views (a) and (b) of FIG. 9, the mounting board 20 may be installed on one side of the back or left plate of the seat 11, and may be installed to be expanded toward the side of the rider.

That is, the mounting board 20 may be installed to protrude from a side surface of the seat 11, or the mounting board being received in the seat 11 may be expanded toward outside of the seat 11 to perform an armrest function.

In addition, as shown in views (a) and (b) of FIG. 10, the mounting board 20 may be expanded toward the side and the front of the rider in the shape of 'L' when viewed from above, and may perform an armrest function and a function of the mounting board.

The mounting board 20 may rotate in the horizontal direction along with the seat when the seat 11 is rotated by the rider.

In addition, the mounting board 20 may be installed to have a second holding member 26 rotate in the horizontal direction or vertical direction with reference to a first holding member 25 which functions as an armrest.

In addition, the mounting board 20 may be rotatably installed to be able to adjust an angle with reference to a portion connected to the seat 11 according to a posture of the rider.

Hereinafter, a configuration for restraining the front of a rider by using the airbag cushion, a configuration for restraining the side of the rider, and a configuration for restraining the front and the side of the rider according to preferred embodiments will be described separately and in sequence with reference to FIGS. 11 to 15.

First Embodiment

Figure 11:
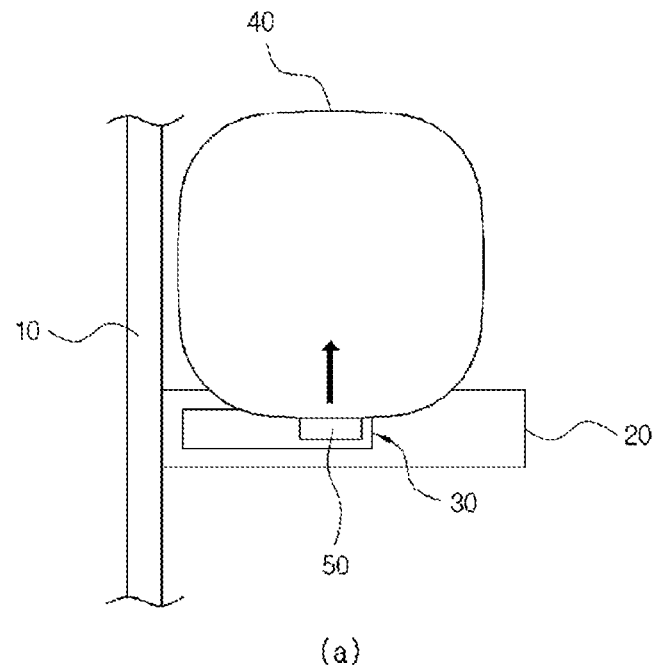
FIGS. 11 and 12 are views illustrating a configuration of an airbag apparatus for a vehicle according to a first embodiment of the present invention.
Figure 11:
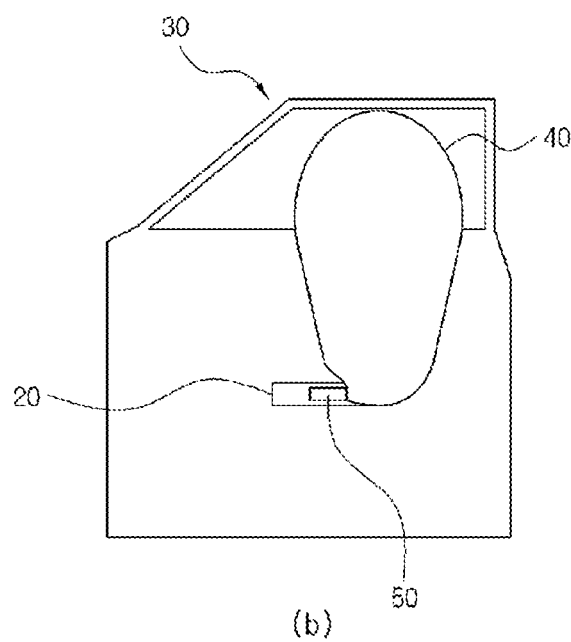
Figure 12:
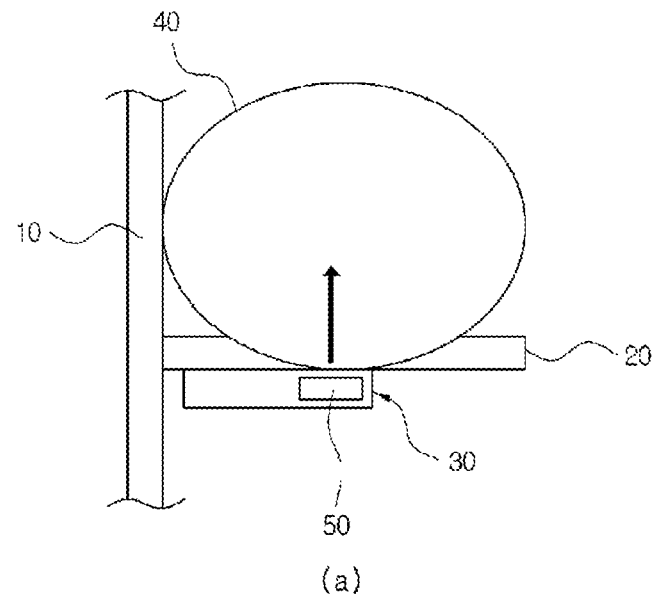
Figure 12:
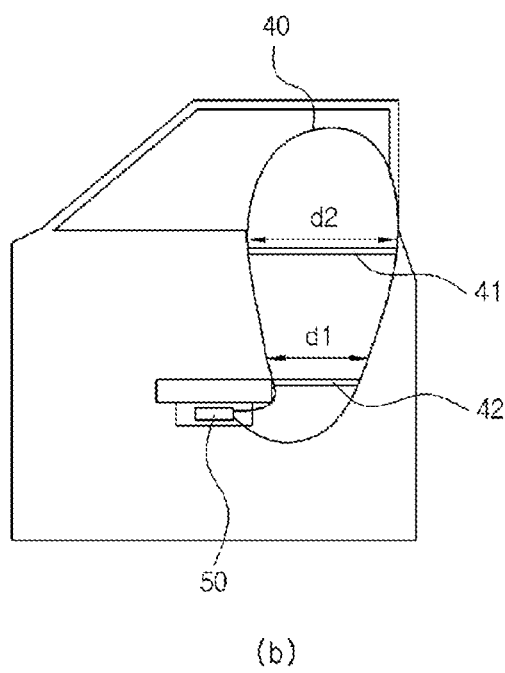

FIGS. 11 and 12 are views illustrating a configuration of an airbag apparatus for a vehicle according to a first embodiment of the present invention.

Views (a) and (b) of FIG. 11 are a front view and a side view illustrating a state in which the airbag module embedded in the mounting board is expanded, and views (a) and (b) of FIG. 12 are a front view and a side view illustrating a state in which the airbag module is expanded under the mounting board.

The airbag module 30 according to the first embodiment of the present invention may be embedded in the mounting board 20 to be invisible from the outside when the mounting board is thicker than a thickness of the airbag module 30 as shown in views (a) and (b) of FIG. 11.

An airbag cushion 40 may protrude toward the outside of the mounting board 20 through a tear line formed on an upper surface, a rear surface, or a side surface of the mounting board 32, and may be inflated and expanded toward the front of the rider.

Of course, the airbag module 30 may be installed on a lower surface of the mounting board 20 that has a thin thickness as shown in views (a) and (b) of FIG. 12.

As described above, the present invention may inflate the airbag cushion 40 of the airbag module 30 installed on the mounting board 20 towards rider's abdomen, and then, may inflate and expand the airbag cushion upwardly to protect the front of rider's abdomen, lower body, and chest.

To achieve this, the airbag module 30 may include the airbag cushion 40 which is supplied with a gas and is inflated and expanded toward the rider, and an inflator 50 which generates a gas by an ignition signal and supplies the generated gas to the airbag cushion 40.

The airbag cushion 40 and the inflator 50 of the airbag module 30 may be embedded in the mounting board 20 or installed on the lower surface of the mounting board 20, while being received in a separate housing.

Of course, the present invention is not limited thereto. The airbag cushion 40 may be inflated and expanded to cover from rider's abdomen to rider's head, or may be inflated and expanded to cover from rider's lower body to rider's chest or head.

That is, the airbag cushion 40 may be formed to be extendable to rider's lower body and chest or head from rider's abdomen.

Herein, the airbag cushion 40 may be formed to have an expansion thickness gradually increase from a lower end to an upper end (d1<d2), and to achieve this, one or more tethers 41, 42 may be installed in the airbag cushion 40 to adjust an expansion shape of the airbag cushion 40.

Second Embodiment

Figure 13:
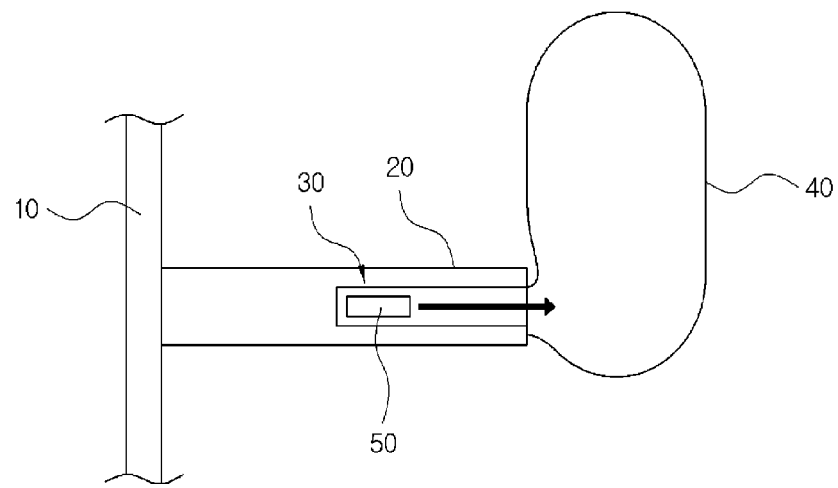
FIG. 13 is a view illustrating a configuration of an airbag apparatus for a vehicle according to a second embodiment of the present invention.
Figure 13:
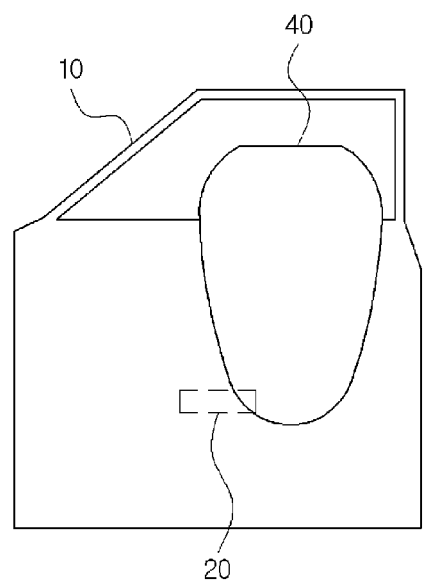

FIG. 13 is a view illustrating a configuration of an airbag apparatus for a vehicle according to a second embodiment of the present invention.

Views (a) and (b) of FIG. 13 are a front view and a side view illustrating a state in which the airbag cushion is expanded from a side surface of the mounting board toward the side of a rider.

As shown in views (a) and (b) of FIG. 13, the airbag module 30 of the vehicle according to the second embodiment of the present invention is installed on an inner side end of the mounting board 20 as shown in views (a) and (b) of FIG. 13, that is, on a right side end when viewed on view (a) of FIG. 13.

Therefore, the airbag module 30 of the vehicle inflates and expands the airbag cushion 40 when the vehicle collides, and restrains the inner side of the rider, thereby performing a far side airbag function to protect the inner side of the rider.

Herein, the airbag cushion 40 may be formed to be extendable to cover the side of rider's lower body and chest or head with reference to rider's abdomen.

Third Embodiment

Figure 14:
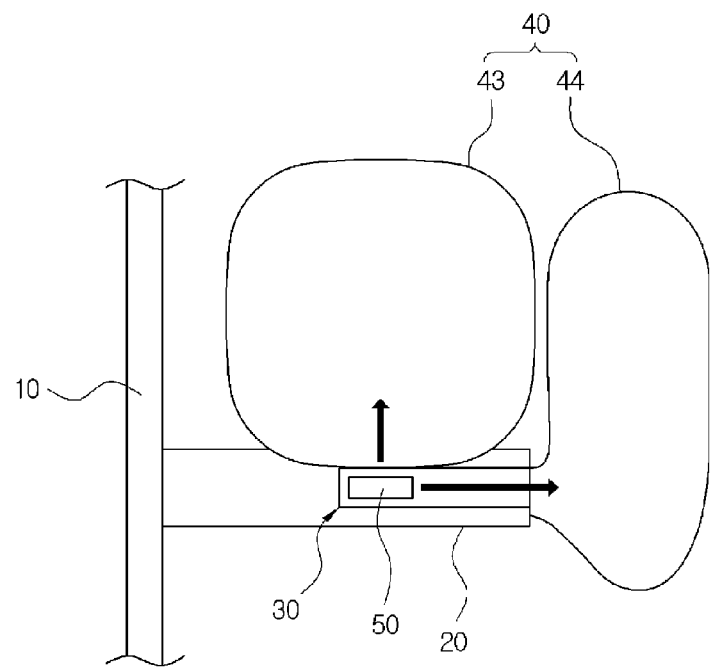
FIGS. 14 and 15 are views illustrating a configuration of an airbag apparatus for a vehicle according to a third embodiment of the present invention.
Figure 15:
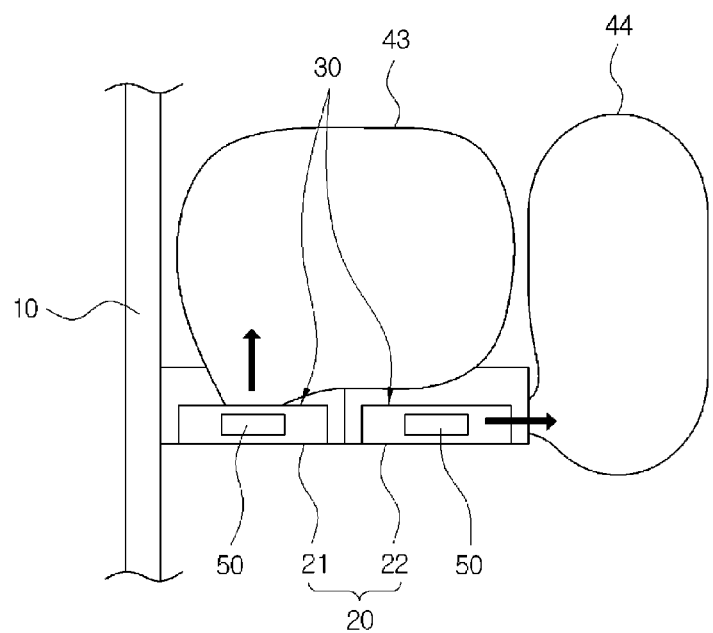

FIGS. 14 and 15 are views illustrating a configuration of an airbag apparatus for a vehicle according to a third embodiment of the present invention.

In the present embodiment, to distinguish between airbag cushions 40 inflated and expanded toward the front and the side of a rider, the airbag cushion expanded toward the front of the rider is referred to as a first airbag cushion 43, and the airbag cushion expanded toward the inner side of the rider is referred to as a second airbag cushion 44.

As shown in FIG. 14, the airbag module 30 of the vehicle according to the third embodiment includes the first and second airbag cushions 43, 44 installed on a center and an inner side end of the mounting board 20, respectively, which is expanded from the door 10 toward the front of the rider in a horizontal direction.

Herein, the first and second airbag cushions 43, 44 may be supplied with a gas from one inflator 50, or may be supplied with a gas from each of the two inflators 50 to correspond to the first and second airbag cushions 43, 44 as shown in FIG. 15.

Of course, the present invention may be changed to form the first and second airbag cushions 43, 44 as a plurality of chambers, and to apply a plurality of inflators 50.

When the plurality of inflators 50 are provided as described above, the controller may transmit an ignition signal only to some of the plurality of inflators 50 according to a direction of a collision of the vehicle, and may control only one of the first and second airbag cushions 43, 44 to be selectively inflated and expanded.

In the same way as the airbag cushion 40 described in the first embodiment, the first airbag cushion 43 may be formed to be extendable to rider's lower body and chest or head from rider's abdomen.

In the same way as the airbag cushion 40 described in the second embodiment, the second airbag cushion 44 may be formed to be extendable to cover the side of rider's lower body and chest or head from rider's abdomen.

Fourth Embodiment

Figure 16:
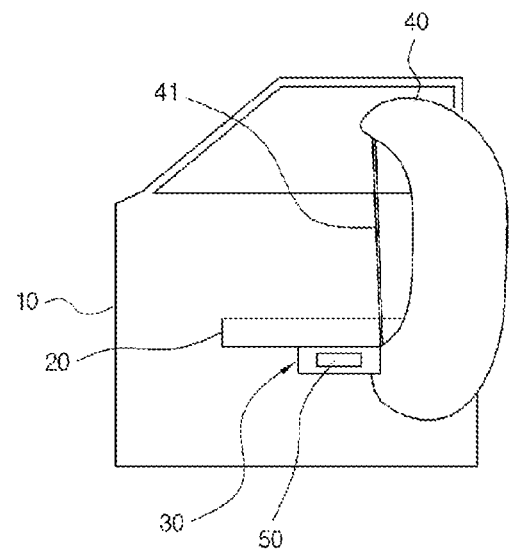
FIGS. 16 and 17 are views illustrating an expansion state of an airbag cushion in an airbag apparatus for a vehicle according to a fourth embodiment of the present invention.
Figure 17:
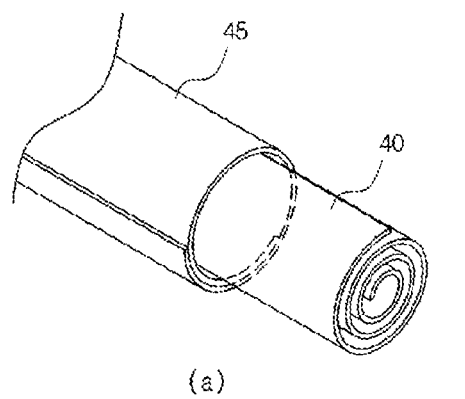
Figure 17:
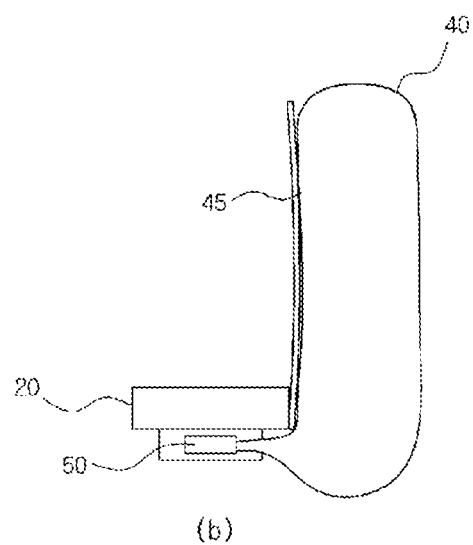

FIGS. 16 and 17 are views illustrating an expansion state of an airbag cushion in an airbag apparatus for a vehicle according to a fourth embodiment of the present invention.

View (a) of FIG. 17 illustrates a flap member surrounding the outside of the airbag cushion, and view (b) of FIG. 17 illustrates a state in which the airbag cushion and the flap member are expanded.

As shown in FIG. 16, the airbag cushion 40 in the airbag module 30 of the vehicle according to the fourth embodiment may be inflated and expanded in a curved shape of substantially Cy when viewed from the side, so that a book or an object held on the mounting board 20 can be prevented from flying toward the rider when the airbag cushion 40 is expanded.

To achieve this, a tether 41 may be installed between an upper end of the airbag cushion 40 and the mounting board 20 to adjust an expansion shape of the airbag cushion 40.

As described above, the present invention inflates and expands the airbag cushion toward the front of the rider, thereby preventing an injury of the rider caused by a flying object from the mounting board.

The airbag module in the fourth embodiment of the present invention can prevent an object on the mounting board from flying by using the flap member 45 surrounding the outside of the airbag cushion 40 which is in a folding or rolling state as shown in view (a) of FIG. 17.

That is, the flap member 45 is expanded when the airbag cushion 40 is inflated and expanded as shown in view (b) of FIG. 17, and may perform a function of absorbing an impact primarily while an object on the mounting board 20 flies.

To achieve this, the flap member 45 may have a lower end fixed to the mounting board 20, and may be expanded upwardly when the airbag cushion 40 is expanded.

Such a flap member 45 may be installed not only on the first airbag cushion 41 corresponding to the front of the rider, but also on the second airbag cushion 42 to prevent an injury of another rider.

As described above, the present invention can prevent an injury of a rider by absorbing an impact of a flying object primarily by using the flap member surrounding the outside of the airbag cushion.

As described above, the present invention can prevent an injury of a rider caused by a flying book or object from the mounting board, by adjusting an expansion shape when the airbag cushion is expanded, or by using the flap member.

Although the invention is specifically described according to the above embodiments, the present invention is not limited to the above embodiments, and may be modified variously within a scope of the technical essence of the present disclosure.

That is, although operations when the autonomous driving mode is set by using the configuration of the airbag apparatus applied to the autonomous vehicle have been described in the above-described embodiments, the present invention is not necessarily limited thereto, and may be changed to compensate for a space between a related-art frontal airbag cushion and a rider according to a posture of the rider in a normal vehicle.

INDUSTRIAL APPLICABILITY

The present invention is applied to airbag technology for a vehicle for safely protecting a rider by expanding an airbag cushion on a mounting board when the vehicle collides.

What is claimed is:

1. An airbag arrangement for a vehicle including a seat for an occupant, the airbag arrangement comprising:
  a first airbag cushion mounted to the vehicle for deployment in front of the seat from a fixed airbag mounting position;
  a second airbag cushion; and
  a mounting arrangement for adjustably mounting the second airbag cushion to one of a seat and a door of the vehicle such that the second airbag cushion is movable relative to the one of the seat and the door in a stowed condition from a first position laterally spaced from the seat and a second position between the first airbag cushion and the seat such the second airbag is inflatable and expandable from the second position to an inflated condition between the first airbag cushion and the seat to restrain and protect the occupant.

2. The airbag arrangement of claim 1,
  wherein the mounting arrangement includes a mounting board mounted to a door of the vehicle.

3. The airbag arrangement of claim 2,
  wherein the mounting board comprises at least one plate, and is installed on an inner side surface of the door to rotate in a vertical direction.

4. The airbag arrangement of claim 2,
  wherein the mounting board is divided into a plurality of plates, and is installed on an inner side surface of the door to rotate in a vertical direction, and
  wherein the plurality of plates slide from the door toward an inside of the vehicle in sequence and are expanded toward a front of the occupant when the mounting board is used.

5. The airbag arrangement of claim 2,
wherein the mounting board is divided into a plurality of plates, and
wherein the plurality of plates are received inside the door, and slide in sequence and are expanded toward a front of the occupant when the mounting board is used.

6. The airbag arrangement of claim 1,
wherein the mounting arrangement includes a mounting board movably installed on a further seat of the vehicle and performs an armrest function.

7. The airbag arrangement of claim 1,
wherein the mounting arrangement includes a mounting board movably installed on a further seat of the vehicle and movably toward a front and a side of the occupant, and performs an armrest function and a holder function.

8. The airbag arrangement of claim 1, further comprising an inflator configured to generate a gas when the vehicle collides and to supply the gas to the second airbag cushion.

9. The airbag arrangement of claim 1, further comprising an inflator configured to generate a gas when the vehicle collides and to supply the gas to the first airbag cushion.

10. The airbag arrangement of claim 1, further comprising an inflator configured to generate a gas when the vehicle collides and to supply the gas to the first and second airbag cushions.

11. The airbag arrangement of claim 1,
wherein the second airbag cushion is formed to have an expansion thickness gradually increase from a lower end to an upper end, and
wherein one or more tethers are installed inside the second airbag cushion to adjust an expansion shape of the second airbag cushion.

12. The airbag arrangement of claim 1,
wherein the second airbag cushion is installed on a mounting board in a rolling or folding state, and
wherein a flap member surrounding an outside of the second airbag cushion is expanded along with the second airbag cushion to prevent an object on the mounting board from flying.

13. The airbag arrangement of claim 1,
wherein the second airbag cushion is expanded in an arcuate shape ng, and
wherein a tether is installed between a mounting board of the mounting arrangement and an upper end of the second airbag cushion to adjust an expansion shape of the second airbag cushion.

14. An airbag arrangement for a vehicle in combination with the vehicle, the airbag arrangement comprising:
a first airbag cushion mounted to the vehicle for deployment in front of the seat from a fixed airbag mounting position;
a second airbag cushion; and
a mounting arrangement for adjustably mounting the second airbag cushion to a door of the vehicle such that the second airbag cushion is movable relative to the door in a stowed condition from a first position laterally spaced from the seat and a second position between the first airbag cushion and the seat such the second airbag is inflatable and expandable from the second position to an inflated condition between the first airbag cushion and the seat to restrain and protect the occupant.

15. An airbag arrangement for a vehicle in combination with the vehicle, the airbag arrangement comprising:
a first airbag cushion mounted to the vehicle for deployment in front of the seat from a fixed airbag mounting position;
a second airbag cushion; and
a mounting arrangement for adjustably mounting the second airbag cushion to a seat of the vehicle such that the second airbag cushion is movable relative to the seat in a stowed condition from a first position laterally spaced from the seat and a second position between the first airbag cushion and the seat such the second airbag is inflatable and expandable from the second position to an inflated condition between the first airbag cushion and the seat to restrain and protect the occupant.

* * * * *